United States Patent [19]
Watanabe et al.

[11] Patent Number: 5,756,009
[45] Date of Patent: May 26, 1998

[54] PROCESS FOR THE PRODUCTION OF AN ELECTRO-CONDUCTIVE OXIDE PARTICLE

[75] Inventors: Yoshitane Watanabe; Keitaro Suzuki; Motoko Iijima, all of Funabashi, Japan

[73] Assignee: Nissan Chemical Industries, Ltd., Tokyo, Japan

[21] Appl. No.: 615,957

[22] Filed: Mar. 14, 1996

Related U.S. Application Data

[62] Division of Ser. No. 343,955, Nov. 17, 1994, Pat. No. 5,582,909.

[30] Foreign Application Priority Data

Nov. 19, 1993  [JP]  Japan ................................. 5-314393

[51] Int. Cl.$^6$ .............................. H01B 1/08; C01G 30/00; C01G 15/00
[52] U.S. Cl. ............... 252/519.1; 428/323; 428/332; 428/402; 423/115; 423/122; 423/593
[58] Field of Search .................. 252/518, 519.1; 428/323, 402, 332; 423/87, 115, 122, 593

[56] References Cited

U.S. PATENT DOCUMENTS

| | | | |
|---|---|---|---|
| 3,449,064 | 6/1969 | Bayer | 23/20 |
| 3,630,969 | 12/1971 | Popowich | 252/514 |
| 3,887,848 | 6/1975 | Larson et al. | 317/33 R |
| 3,984,353 | 10/1976 | Sergunkin et al. | 252/461 |
| 5,204,233 | 4/1993 | Ogasawara et al. | 430/523 |
| 5,368,995 | 11/1994 | Christian et al. | 430/530 |
| 5,396,148 | 3/1995 | Endo et al. | 313/479 |

FOREIGN PATENT DOCUMENTS 6-219743  8/1994  Japan.

OTHER PUBLICATIONS

Database WPI, Derwent Publications Ltd., AN 92 223634, JP-A-04 149 837, May 22, 1992.

*Primary Examiner*—Paul Lieberman
*Assistant Examiner*—Mark Kopec
*Attorney, Agent, or Firm*—Oblon, Spivak, McClelland, Maier & Neustadt, P.C.

[57] ABSTRACT

An electro-conductive oxide particle comprising indium atoms, antimony atoms and oxygen atoms in a molar ratio of In:Sb:O being 1:0.02–1.25:1.55–4.63 and having a primary particle diameter of from 5 to 500 nm.

20 Claims, 3 Drawing Sheets

PROCESS FOR THE PRODUCTION OF AN ELECTRO-CONDUCTIVE OXIDE PARTICLE

This is a division of application Ser. No. 08/343,955 filed on Nov. 17, 1994, now U.S. Pat. No. 5,582,909.

The present invention relates to an electro-conductive oxide particle comprising indium atoms, antimony atoms and oxygen atoms, and processes for its production. The electro-conductive oxide particle of the present invention has electron electro-conductivity and thus is useful as e.g. electro-conductive agents, antistatic agents or electric resistors for e.g. plastics, fibers, paper, glass or ceramics. Further, it is useful also as flame retardants for plastics, since it contains antimony pentoxide.

In Zeitschrift fuer Kristallographie Bd. 118, s. 158–160 (1963), it is reported that when a mixture of $In_2O_3$ and $Sb_2O_3$ in a molar ratio of 1 is gradually heated to 850° C., then calcined lat 1000° C. for 20 hours and quenched, indium antimonate $InSbO_4$ having a rutile structure will be formed by a solid phase reaction of $In_2O_3$ and $Sb_2O_3$, and X-ray diffraction data are given. Further, Neorganisheskie Materialy, Vol. 11, No. 8 1416–1419 (1975) reports that when a mixture or a coprecipitated product comprising indium oxide and an antimony pentoxide ($Sb_2O_5 \cdot xH_2O$) with a molar ratio $In_2O_3/Sb_2O_5 \cdot xH_2O$ being 1, was calcined at a temperature of from 700° to 800° C., or from 850° to 900° C., only a mixture comprising a phase having a rutile structure, indium oxide ($In_2O_3$) and antimony oxide ($Sb_6O_{13}$ or $Sb_2O_4$), was obtained. In this report, it is disclosed that indium antimonate ($InSbO_4$) is steel gray and has a strained rutile structure, and the X-ray refraction pattern is disclosed.

In the above literature, it is reported that when a mixture or a coprecipitated product of indium oxide and antimony trioxide or antimony pentoxide is calcined at a temperature of from 700° to 1000° C., indium antimonate will be formed, but there is no report on electro-conductivity of indium antimonate. Further, it is well known that an indium oxide-tin oxide type oxide (ITO) having tin oxide doped on indium oxide, exhibits excellent electro-conductivity (e.g. Japanese Examined Patent Publication No. 212268/1982) and is widely used as a transparent electro-conductive film material. However, there is no disclosure indicating that an antimony pentoxide-doped indium oxide exhibits excellent electro-conductivity.

U.S. Pat. No. 3,449,064 discloses that indium nitrate and fine diantinomy trioxide ($Sb_2O_3$) were mixed in equimolar amounts and gradually heated to 500° C. to convert them to indium oxide and diantimony pentoxide, and then the mixture was cooled to room temperature, ground, compacted and heated in an oxygen atmosphere at 750° C. for 4 hours, at 850° C. for 4 hours and finally at 1000° C. for 20 hours, to obtain indium antimonate ($InSbO_4$), and the obtained indium antimonate had a volume resistivity of 2 $\Omega cm$. However, in this US Patent, no colloidal antimony oxide is used, and it is necessary to conduct the solid phase reaction at a temperature as high as 1000° C., whereby growth of particles is promoted by sintering, and the particle size of the-resulting indium antimonate tends to be very large. Even when such particles are dispersed in a solvent, it is hardly possible to obtain a stable sol. Accordingly, it is difficult to uniformly incorporate such particles into a base material, or it is difficult to form a coating film having good transparency, and it is difficult to obtain a satisfactory antistatic function.

It is an object of the present invention to provide a novel electro-conductive oxide particle comprising indium, antimony and oxygen in an atomic ratio of In:Sb:O being 1:0.02–1.25:1.55–4.63 and having a primary particle diameter of from 5 to 500 nm and processes for its production.

Namely, the present invention provides an electro-conductive oxide particle comprising indium atoms, antimony atoms and oxygen atoms in a molar ratio of In:Sb:O being 1:0.02–1.25:1.55–4.63 and having a primary particle diameter of from 5 to 500 nm.

When the electro-conductive oxide particle of the present invention comprises indium atoms, antimony atoms and oxygen atoms in a molar ratio of In:Sb:O being 1:0.83–1.25:3.58–4.63, it constitutes an electro-conductive oxide particle having a crystal structure of indium antimonate. Further, when it comprises indium atoms, antimony atoms and oxygen atoms in a molar ratio of In:Sb:O being 1:0.10–0.83:1.75–3.58, it constitutes a mixture comprising an electro-conductive oxide particle having a crystal structure of indium antimonate, an electro-conductive oxide particle having a crystal structure of indium oxide, and an electro-conductive oxide particle having a crystal structure of indium antimonate and a crystal structure of indium oxide. Furthermore, when it comprises indium atoms, antinomy atoms and oxygen atoms in a molar ratio of In:Sb:O being 1:0.02–0.10:1.55–1.75, it constitutes an electro-conductive oxide particle having a crystal structure of indium oxide.

A process for producing the electro-conductive oxide particle comprising indium atoms, antimony atoms and oxygen atoms in a molar ratio of In:Sb:O being 1:0.02–1.25:1.55–4.63 and having a primary particle diameter of from 5 to 500 nm, according to the present invention, is characterized by mixing an indium compound with an antimony oxide particle having a primary particle diameter of from 2 to 300 nm in a molar ratio of In/Sb being from 0.8 to 50 and calcining the mixture in the atmosphere at a temperature of from 700° to 900° C. In the above process for producing the electro-conductive oxide particle, when the indium compound is mixed with the antimony oxide particle having a primary particle diameter of from 2 to 300 nm in a molar ratio of In/Sb being from 0.8 to 1.2, such will be a process for producing the electro-conductive oxide particle comprising indium atoms, antimony atoms and oxygen atoms in a molar ratio of In:Sb:O being 1:0.83–1.25:3.58–4.63, having a primary particle diameter of from 5 to 500 nm and having a crystal structure of indium antimonate. Likewise, when the starting materials are mixed in a molar ratio of In/Sb being from 1.2 to 10, such will be a process for producing a mixture comprising the electro-conductive oxide particle having a crystal structure of indium antimonate, the electro-conductive oxide particle having a crystal structure of indium oxide and the electro-conductive particle having a crystal structure of indium antimonate and a crystal structure of indium oxide, wherein the respective particles have a primary particle diameter of from 5 to 500 nm, and said mixture comprises indium atoms, antimony atoms and oxygen atoms in a molar ratio of In:Sb:O being 1:0.10–0.83:1.75–3.58. Further, when the starting materials are mixed in a molar ratio of In/Sb being from 10 to 50, such will be a process for producing the electro-conductive oxide particle comprising indium atoms, antimony atoms and oxygen atoms in a molar ratio of In:Sb:O being 1:0.02–0.10:1.55–1.75 and having a crystal structure of indium oxide.

In the present invention, the indium compound may be any indium compound, so long as it is capable of forming the electro-conductive oxide particle comprising indium atoms, antimony atoms and oxygen atoms in a molar ratio of In:Sb:O being 1:0.02–1.25:1.55–4.63 and having a primary particle diameter of from 5 to 500 nm, by mixing it with the antimony oxide particle having a primary particle diameter of from 2 to 300 nm in a molar ratio of In/Sb being from 0.8 to 50 and calcining the mixture in the atmosphere at a temperature of from 700° to 900° C. Among such indium compounds, it is preferred to employ at least one indium compound selected from the group consisting of indium hydroxide, indium oxide, an indium salt of inorganic acid, an indium salt of organic acid and an organic indium compound.

The indium salt of inorganic acid may, for example, be indium carbonate, basic indium carbonate, indium nitrate, indium chloride, indium sulfate or indium sulfamate. The indium salt of organic acid may, for example, be indium oxalate. The organic indium compound may, for example, be an alkoxide of indium, particularly tetraethoxy indium. These indium compounds may be those commercially available as industrial reagents. However, when indium hydroxide or indium oxide is used, a product having a primary particle diameter of not more than 500 nm as observed by a transmission electron microscope, is preferred. When an indium salt is used, a salt having an acid which is readily volatile by calcining, such as a carbonate, a nitrate or an organic acid salt is preferred. Among them, indium nitrate, indium hydroxide or indium oxide is particularly preferred. One or more such indium salts may be used. These indium compounds may be employed in the form of an aqueous solution or a solution dissolved or dispersed in an organic solvent, or in a powder form.

The antimony oxide to be used in the present invention is antimony oxide having a primary particle diameter of from 2 to 300 nm as observed by a transmission electron microscope. Here, the primary particle diameter is the diameter of a particle at separated aggregation particle individually i.e not the diameters of particles in a state of aggregation. The antimony oxide having a primary particle diameter of from 2 to 300 nm may, for example, be a diantimony pentoxide sol, a hexantimony tridecoxide sol, a hydrous diantimony tetroxide sol or a colloidal diantimony trioxide powder. The diantimony pentoxide sol can be prepared by a known method such as a method of oxidizing diantimony trioxide (Japanese Examined Patent Publication No. 11848/1982), a method of dealkalizing an alkali metal antimonate by an ion exchange resin (U.S. Pat. No. 4,110,247), a method of subjecting sodium antimonate to acid treatment (Japanese Unexamined Patent Publications No. 41536/1985 and No. 182116/1987). The hexantimony tridecoxide sol can be prepared by a method of oxidizing diantimony trioxide (Japanese Unexamined Patent Publication No. 125849/1987). Likewise, the hydrous diantimony tetroxide sol can be produced by a method of oxidizing diantimony trioxide (Japanese Unexamined Patent Publication No. 21298/1977). The colloidal diantimony trioxide can be produced by a gas phase method (Japanese Examined Patent Publication No. 3292/1986). The antimony oxide sol to be used in the present invention is preferably an acidic sol which has a primary particle diameter of from 2 to 300 nm as observed by a transmission electron microscope and which contains no base such as amine or sodium hydroxide. The antimony oxide sol has a concentration of $Sb_2O_5$, $Sb_6O_{13}$ or $Sb_2O_4$ of from 1 to 60 wt % and can be used as a sol having such $Sb_2O_5$, $Sb_6O_{13}$ or $Sb_2O_4$ particles dispersed in water or in an organic solvent. Such an antimony oxide sol may be used also as a powder of antimony oxide dried by e.g. spray drying, vacuum drying or freeze drying. As the antimony oxide, a commercial product available as an industrial reagent in the form of a diantimony pentoxide sol, a diantimony pentoxide powder, super fine diantimony trioxide powder, may be employed, but particularly preferred is diantimony pentoxide commercially available in the form of a diantimony pentoxide sol or a diantimony pentoxide powder.

Mixing of the above indium compound with the antimony oxide sol can be carried out by means of an apparatus such as a Satake-type stirrer, a Pfaudler-type stirrer or a disper at a mixing temperature of from 0° to 100° C. for a mixing time of from 0.1 to 30 hours. Mixing of the above indium compound with a dried product of the antimony oxide sol or a colloidal diantimony triaxide powder, can be conducted by an apparatus such as a mortar, a V-type mixer, a Henschel mixer or a ball mill. In the present invention, it is preferred to mix the above indium compound with the antimony oxide sol or with its dried product or with the colloidal diantimony trioxide powder, so that the molar ratio of In/Sb would be from 0.8 to 50.

It is particularly preferred to mix an indium compound soluble in water with a diantimony pentoxide sol. In such a case, the mixing temperature may be from 0° to 100° C. However, especially when a diantimony pentoxide sol is employed, the higher the mixing temperature, the better the adsorption of indium ions in the diantimony pentoxide structure, since the diantimony pentoxide particle is a cation exchanger. Accordingly, the mixing temperature is preferably high at a temperature of from 80° to 100° C. The mixing can be conducted at a temperature higher than 100° C., but in such a case, there is a restriction from the viewpoint of the apparatus, such that an autoclave is required to be used.

Further, at the time of such mixing, the pH of the mixture can be adjusted, as the case requires, with ammonia or an organic base such as guanidine hydroxide.

In the present invention, drying of the mixture (slurry) of the above indium compound with an antimony oxide sol, can be conducted by e.g. a spray drier, a drum drier, a box-type hot-air drier, a vacuum drier or a freeze drying machine. Further, this slurry may be separated by suction filtration, centrifugal separation or filter press, and in some cases, soluble impurities from the starting material may be removed by washing with water, to obtain a wet cake. This cake can be dried by e.g. the above mentioned box-type direr. The drying temperature is not particularly limited, but is usually preferably lower than 300° C. from the viewpoint of the apparatus or operation.

In the present invention, calcining of the above-mentioned dried product of the mixture of the indium compound with the antimony oxide sol, or the mixture of the indium compound with a dried product of the antimony oxide sol or the colloidal diantimony trioxide powder, is conducted at a temperature of from 700° to 900° C., preferably from 720° to 850° C. for from 0.5 to 50 hours, preferably from 2 to 30 hours. By such calcining, the indium oxide and the colloidal antimony oxide are reacted by solid phase reaction to form the electro-conductive oxide particle having a crystal structure of indium antimonate, the electro-conductive oxide particle having a crystal structure of indium antimonate and a crystal structure of indium oxide, and the electro-conductive oxide particle having a crystal structure of indium oxide.

The electro-conductive oxide particle of the present invention is yellowish white to bluish gray, and indium antimonate is bluish gray.

As a result of the X-ray diffraction, the electro-conductive oxide particle having a crystal structure of indium antimonate ($InSbO_4$) obtained by the process of the present invention, shows diffraction peaks of indium antimonate (InSbO$_4$) which correspond to the diffraction peaks of indium antimonate (InSbO$_4$, ASTM No. 15-522 (Zeitschrift fuer Kristallographie Bd. 118, s. 158–160)) disclosed in ASTM (Index to the X-ray Powder-Date File Inorganic). However, the diffraction peaks were slightly broad, thus indicating that crystallization did not proceed very much. The diffraction peaks of this indium antimonate did not include peaks attributable e.g. In$_2$O$_3$ and Sb$_2$O$_4$ as impurities as disclosed in Neorganisheskie Materialy, Vol. 11 No. 8, 1416–1419 (1975). Further, the diffraction peaks of the electro-conductive oxide particle having a crystal structure of indium oxide obtained by the process of the present invention were found to be slightly shifted from the diffraction peaks of pure indium oxide.

Further, as a result of differential thermal analysis (DTA-TG), the electro-conductive oxide having a crystal structure of indium antimonate prepared by the present invention, has been confirmed to be an anhydride having no water of crystallization, which is free from weight reduction within a temperature range of from room temperature to 1000° C.

As a result of the observation by a-transmission electron microscope, the electro-conductive oxide particle of the present invention was confirmed to be fine particle of a colloidal level with the primary particle diameter being from 5 to 500 nm.

Further, the electro-conductive oxide particle of the present invention was confirmed to have excellent electro-conductivity with a resistivity of a level of from 1 Ω to 100 kΩ.

The electro-conductive oxide particle obtained by the present invention can readily be made into an aqueous sol or an organic solvent sol by wet-pulverizing them in water or in an organic solvent by e.g. a sand grinder, a ball mill, a homogenizer, a disper or a colloid mill. In the present invention, the obtained aqueous sol of the electro-conductive oxide particle, may be made into an aqueous sol having higher dispersibility, as the case requires, by heating and aging it at a temperature of from 60° to 100° C. for from 0.5 to 30 hours. Further, in the present invention, the obtained aqueous sol of the electro-conductive oxide particle may be contacted with an ion exchange resin, as the case requires, to remove impurity ions and obtain an aqueous sol of the electro-conductive oxide particle having a high purity. The above aging treatment and the above ion exchange treatment may be in any order. However, it is preferred to conduct the ion exchange treatment after the aging treatment. Furthermore, the electro-conductive oxide particle having a crystal structure of indium antimonate of the present invention, was found to remain to be anhydrous without being converted to a hydrate, even when pulverized or heated in water.

When the electro-conductive oxide particle of the present invention is wet-pulverized to form an aqueous sol or an organic solvent sol, an alkylamine such as ethylamine, propylamine, isopropylamine or diisobutylamine, an alkanolamine such as triethanolamine or monoethanolamine, a diamine such as ethylenediamine, and an hydroxycarboxylic acid such as lactic acid, tartaric acid, malic acid or citric acid, may be added for stabilization, as the case requires. As the organic solvent, an alcohol, such as methyl alcohol, propyl alcohol or butyl alcohol, a glycol such as ethylene glycol, diethylene glycol or ethylene glycol, a cellosolve such as ethyl cellosolve or propyl cellosolve or an amide such as dimethylformamide or dimethylacetamide may, for example, be used. In the present invention, the aqueous sol of the electro-conductive oxide particle may be subjected to substitution by the above described organic solvent to obtain an organic solvent sol. The particle diameters of the above-mentioned aqueous sol or organic solvent sol of the electro-conductive oxide particle are not more than 500 nm, as observed by a transmission electron microscope.

In the present invention, at the time of mixing the indium compound with the antimony oxide particle, the fine particle of antimony oxide of from 2 to 300 nm is used as the antimony oxide starting material, whereby the reactivity is remarkably high even at a calcining temperature of not higher than 1000° C., and a uniform phase can be formed, and thus, an oxide having excellent electro-conductivity can be obtained. Further, in the present invention, calcining is not conducted at such a high temperature as exceeding 900° C. Accordingly, there will be no growth of particle due to sintering, and the product will be in the form of the fine particle of from 5 to 500 μm. Such the fine particle can readily be dispersed in water and/or an organic solvent to obtain a sol.

In the present invention, when the In/Sb molar ratio is less than 0.8, the product will be a mixture of indium antimonate and diantimony tetroxide, and the electro-conductivity tends to be low, such being undesirable. On the other hand, if the In/Sb molar ratio exceeds 50, the strain in the structure of indium oxide tends to be small, and the electro-conductivity tends to be low, such being undesirable.

In the present invention, the mixing time of the indium compound with the antimony oxide particle having a primary particle diameter of from 2 to 300 nm, is from 0.1 to 30 hours. It may be less than 0.1 hour, but such is not desirable since the mixing is likely to be inadequate. The mixing may be conducted more than 30 hours, but such is not efficient, since the production time will be unnecessarily long.

In the present invention, the temperature for calcining the dried product of the mixture of the indium compound with the antimony oxide sol, or the mixture of the indium compound with a dried product of the antimony oxide sol or with the colloidal diantimony trioxide, is from 700° to 900° C. If the calcining temperature is lower than 700° C., the solid phase reaction hardly takes place, and the product will be a mixture of indium oxide and diantimony tetroxide, and no electro-conductive oxide will be obtained, such being undesirable. On the other hand, if the calcining temperature exceeds 900° C., although the solid phase reaction of antimony oxide and indium oxide proceeds, gray colored indium antimonate will be formed, and the product tends to show no electro-conductivity, such being undesirable.

Figure 1:
FIG. 1 is a transmission electron microscopic photograph showing the particle structure of an aqueous sol of electro-conductive oxide particles having a crystal structure of indium antimonate prepared in Example 2, and the magnification is 200,000 times.
Figure 2:
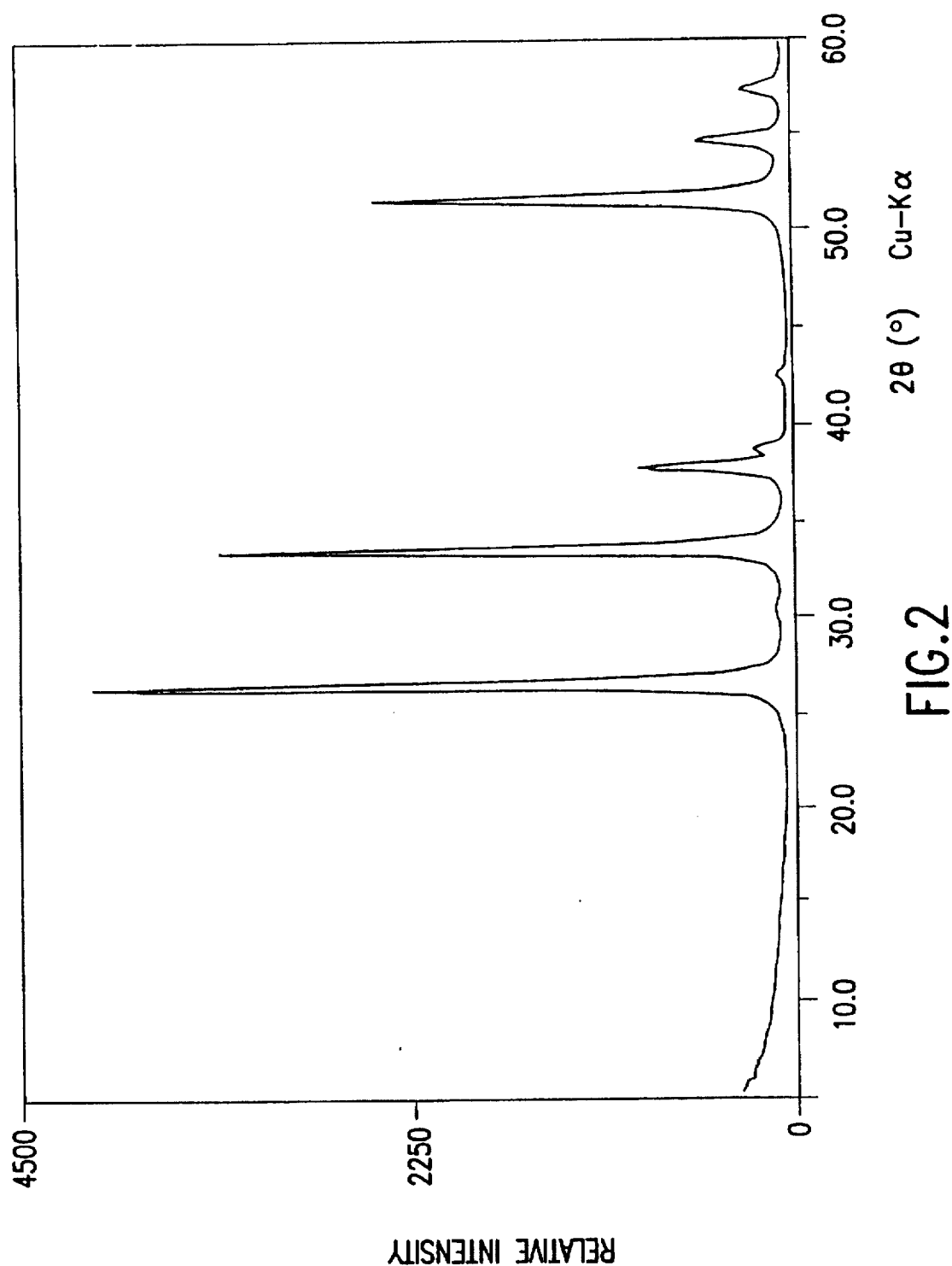
FIG. 2 is an X-ray diffraction pattern of the electro-conductive oxide having a crystal structure of indium antimonate prepared in Example 2.
Figure 3:
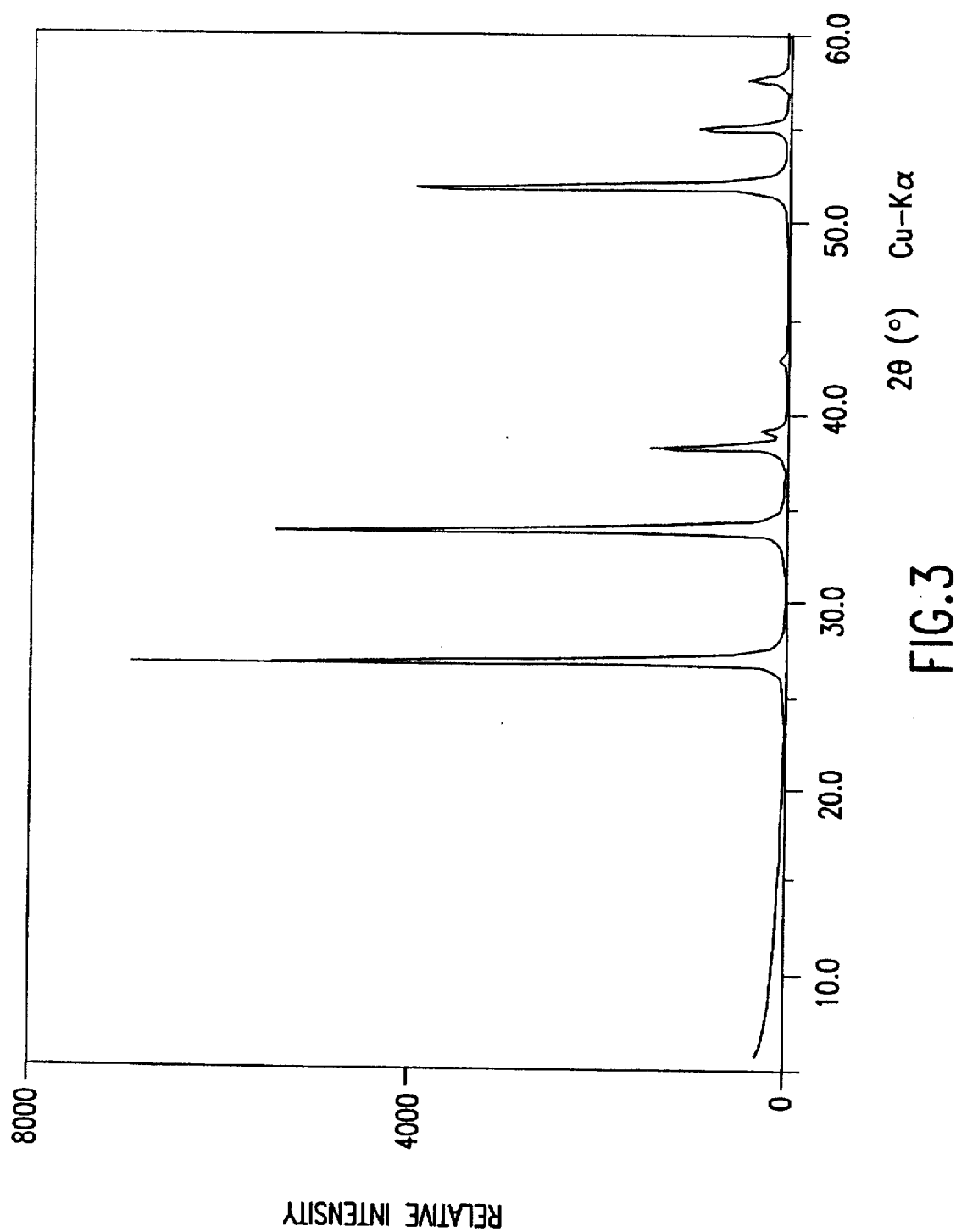
FIG. 3 is an X-ray diffraction pattern of an oxide having a crystal structure of indium antimonate prepared in the Comparative Example 1.

Now, the present invention will be described in further detail with reference to Examples. However, it should be understood that the present invention is by no means restricted by such specific Examples.

Preparation of a Diantimony Pentoxide Sol as the Starting Material

PREPARATION EXAMPLE 1

1300 g of diantimony trioxide (manufactured by Mikuni Seiren K.K.) was dispersed in 5587 g of water. Then, 953.7 g of a 35% hydrogen peroxide aqueous solution was added thereto. The mixture was heated to from 90° to 100° C. and reacted for 2 hours to obtain a diantimony pentoxide sol. The obtained sol had a specific gravity of 1.198, a pH of 1.80, a viscosity of 19.5 c.p., a concentration as $Sb_2O_5$ of 18.4 wt %, a particle diameter of from 20 to 30 nm as observed by a transmission electron microscope and a specific surface area of 55.0 $m^2/g$ as measured by a BET method.

Example 1

900 g of water was added to 600 g of the diantimony pentoxide sol (specific gravity: 1.198, $Sb_2O_5$ concentration: 18.4 wt %) prepared in Preparation Example 1 for dilution. Then, an aqueous indium nitrate solution having 242.2 g of indium nitrate ($In(NO_3)_3 \cdot 3H_2O$, $In_2O_3$ content: 39.1 wt %, guaranteed reagent, manufactured by Mitsuwa Kagaku Yakuhin K.K.) dissolved in 200 g of water, was added thereto with stirring at room temperature. Then, the mixture was heated at 90° C. for 6 hours to obtain a mixed slurry of indium hydroxide and diantimony pentoxide. This slurry had an $In_2O_3$ concentration of 4.9 wt %, a $Sb_2O_5$ concentration of 5.7 wt % and an $In_2O_3/Sb_2O_5$ molar ratio of 1.0.

This slurry was evaporated to dryness at 150° C. by a hot air drier, and further heated at 300° C. to obtain 223.6 g of a dried product. This dried product was pulverized in a mortar to obtain a powder. The powder was put into an aluminum crucible and calcined in an electric furnace at 780° C. for 13 hours to obtain 182.6 g of a powder. This powder was bluish gray and as a result of the X-ray diffraction, was found to correspond to the diffraction peaks of indium antimonate ($InSbO_4$) of ASTM.

This powder was pulverized by a Jet-O-Mizer to obtain a fine powder having an average particle diameter of 1.2 µm as measured by a centrifugal sedimentation particle distribution measurement. Further, this powder had a specific surface area of 14.1 $m^2/g$ as measured by a BET method and a particle size of 61.5 nm as calculated from the specific surface area. Further, from the transmission electron microscopic observation, the powder was a colloidal particle of substantially-spherical shape with a primary particle diameter of from 20 to 50 nm. This powder was press-molded under a pressure of 100 $kg/cm^2$, and the press-molded product showed an electro-conductivity with a specific resistance of 10 Ωcm.

This powder was analyzed by fluorescent X-rays. As a result of the analysis, the $In_2O_3$ content was 45.1%, the $Sb_2O_5$ content was 54.9%, and the $In_2O_4/Sb_2O_5$ molar ratio was 1.01.

Example 2

334 g of water was added to 600 g of the diantimony pentoxide sol (specific gravity: 1.198, $Sb_2O_5$ concentration: 18.4 wt %) prepared in Preparation Example 1 for dilution. Then, an aqueous indium nitrate solution having 230.1 g of indium nitrate ($In(NO_3)_3 \cdot 3H_2O$, $In_2O_3$ content: 39.1 wt %, guaranteed reagent, manufactured by Mitsuwa Kagaku Yakuhin K.K.) dissolved in 280 g of water, was added thereto with stirring at room temperature. Then, the mixture was heated to 90° C. and maintained at that temperature for 10 hours. Then, 219.0 g of 28% aqueous ammonia (guaranteed reagent) was added to adjust the pH of the slurry to 7.06, to obtain a mixed slurry of indium hydroxide and diantimony pentoxide. This slurry had an $In_2O_3$ concentration of 6.23 wt %, a $Sb_2O_5$ concentration of 7.64 wt % and an $In_2O_3/Sb_2O_5$ molar ratio of 0.95. This slurry was subjected to filtration under suction and then washed with water using 9000 g of pure water, to obtain a wet cake. This wet cake was evaporated to dryness at 150° C. by a hot air drier to obtain 234.6 g of a dried product. This dried product was pulverized by a mortar to obtain a powder. The powder was put into an aluminum crucible and calcined in an electric furnace at 720° C. for 4 hours and further calcined at 740° C. for 10 hours to obtain 191.7 g of a powder. This powder was bluish gray and as a result of the X-ray diffraction, found to correspond to the diffraction peaks of indium antimonate ($InSbO_4$) of ASTM. This powder was pulverized by a Jet-O-Mizer to obtain a fine powder having an average particle diameter of 0.9 µm as measured by a centrifugal sedimentation particle size distribution measurement. Further, this powder had a specific surface area of 33.5 $m^2/g$ as measured by a BET method and a particle diameter of 26.0 nm as calculated from the specific surface area. Further, from the transmission electron microscopic observation, the powder was found to be a colloidal particle of substantially spherical shape with a primary particle diameter of from 15 to 50 nm. This powder was press-molded under a pressure of 100 $kg/cm^2$, and the press-molded product showed an electro-conductivity with a specific resistance of 8.0 Ωcm.

This powder was dissolved in hydrochloric acid by means of an autoclave and analyzed by ICP. As a result of the analysis, the $In_2O_3$ content was 45.0 wt %, the $Sb_2O_5$ content was 55.0 wt %, and the $In_2O_3/Sb_2O_5$ molar ratio was 0.95. 150 g of this powder was dispersed in 348 g of water to an indium antimonate concentration of 30 wt %. Then, 450 g of glass beads (soda glass beads: 2–3 mm in diameter) were added thereto, followed by pulverization by a ball mill for 240 hours. Then, the glass beads were separated to obtain 873.3 g of an aqueous sol of indium antimonate.

The obtained aqueous sol was aged at 90° C. for 15 hours, then cooled and subjected to anion exchange and further to cation exchange. Then, the product was concentrated to 498.8 g by a rotary evaporator to obtain a highly concentrated aqueous sol of indium antimonate. This aqueous sol was transparent bluish gray and had a specific gravity of 1.144, a pH of 3.33, a viscosity of 5.5 c.p. and an electro-conductivity of 102.5 µs/cm, an $InSbO_4$ concentration of 17.0 wt %, an average particle diameter of 176 nm as measured by a dynamic light-scattering method used $N_4$ apparatus manufactured by Coulter Inc. in U.S.A., a particle diameter of 23.7 nm as measured by a BET method, a particle diameter of from 15 to 50 nm as measured by an electron microscopic observation and an average particle diameter of 0.08 µm as measured by a centrifugal sedimentation method.

This sol was stable without formation of a precipitate or abnormality such as gelation, even when left to stand at 50° C. for 1 month.

This sol was coated on a glass sheet by an applicator and dried at 150° C. to form a conductive film of about 5 µm. The transmittance of this glass sheet was 96.4%, thus showing excellent transparency. Further, the electro-conductivity was measured and found to be 20 MΩcm.

To 160 g of the above aqueous sol, 0.1 g of isopropyl amine was added to adjust the pH, and then it was put into an egg plant-type flask and subjected to a solvent substitution in a rotary evaporator while charging 6 l of methanol under reduced pressure, to obtain 151.3 g of a methanol sol of indium antimonate. This methanol sol had a specific gravity of 0.912, a pH (measured as diluted with an equal weight of water) of 5.71, a viscosity of 3.0 c.p., an indium antimonate concentration of 18.0 wt %, a transmittance of 52.2% when adjusted the concentration to 0.2 wt %, and an electro-conductivity of 7.40 μs/cm, and an average particle diameter of 187 nm as measured by a dynamic light-scattering method.

Example 3

300 g of water was added to 600 g of the diantimony pentoxide sol (specific gravity: 1.198, $Sb_2O_5$ concentration: 18.4 wt %) prepared in Preparation Example 1 for dilution. Then, an aqueous indium nitrate solution having 242.2 g of indium nitrate ($In(NO_3)_3 \cdot 3H_2O$, $In_2O_3$ content: 39.1 wt %, guaranteed reagent, manufactured by Mitsuwa Kagaku Yakuhin K.K.) dissolved in 241.5 g of water, was added thereto with stirring at room temperature. Then, the mixture was heated to 90° C. and maintained at that temperature for 10 hours. Then, 125.8 g of 28% aqueous ammonia (guaranteed reagent) was added thereto to adjust the pH of the slurry to 7.05, to obtain a mixed slurry of indium hydroxide and diantimony pentoxide. This slurry had an $In_2O_3$ concentration of 6.27 wt %, a $Sb_2O_5$ concentration of 7.31 wt % and an $In_2O_3/Sb_2O_5$ molar ratio of 1.0.

This slurry was subjected to filtration under suction and then washed with water by using 4000 g of pure water to obtain a wet cake. The wet cake was evaporated to dryness at 150° C. by a hot air drier to obtain 210.2 g of a dried product. This dried product was pulverized by a mortar to obtain a powder. Then, the powder was put into an aluminum crucible and calcined in an electric furnace at 720° C. for 5 hours and further calcined at 740° C. for 10 hours to obtain 193.0 g of a powder. This powder was bluish gray and as a result of the X-ray diffraction, was found to correspond to the diffraction peaks of indium antimonate ($InSbO_4$) of ASTM.

This powder was pulverized by a Jet-O-Mizer to obtain a fine powder having an average particle diameter of 1.2 μm as measured by a centrifugal sedimentation particle size distribution measurement. Further, this powder had a specific surface area of 36.5 m$^2$/g as measured by a BET method and a particle diameter of 23.8 nm as calculated from the specific surface area. Further, from the transmission electron microscopic observation, the powder was found to be a colloidal particle of substantially spherical shape with a primary particle diameter of from 20 to 50 nm. This powder was press-molded under a pressure of 100 kg/cm$^2$, and the press-molded product showed an electro-conductivity with a specific resistance of 10 Ωcm.

This powder was dissolved in hydrochloric acid by means of an autoclave and analyzed by ICP. As a result of the analysis, $In_2O_3$ was 46.0%, $Sb_2O_5$ was 54.0%, and the $In_2O_3/Sb_2O_5$ molar ratio was 0.99.

Example 4

To 6.67 g of a powder ($Sb_2O_5$ content: 90 wt %) obtained by spray drying the diantimony pentoxide sol (specific gravity: 1.198, $Sb_2O_5$ concentration: 18.4 wt %) prepared in Preparation Example 1, 11.26 g of indium hydroxide ($In_2O_3 \cdot xH_2O$, $In_2O_3$ content: 80 wt %, manufactured by Mitsuwa Kagaku Yakuhin K.K.) was mixed and pulverized in a mortar to obtain a powder having an $In_2O_3/Sb_2O_5$ molar ratio of 1.75. Then, this powder was put into an aluminum crucible and calcined in an electric furnace at 800° C. for 16 hours.

This powder was slightly bluish gray and as a result of the X-ray diffraction, was found to correspond to the diffraction peaks of indium antimonate ($InSbO_4$) of ASTM, and the diffraction peaks slightly shifted from the diffraction peaks of pure indium oxide.

This powder was pulverized by a Jet-O-Mizer to obtain a fine powder having an average particle diameter of 0.65 μm as measured by a centrifugal sedimentation particle size distribution measurement. Further, this powder had a specific surface area of 11.9 m$^2$/g as measured by BET method and a particle diameter of 73.4 nm as calculated from the specific surface area. Further, from the transmission electron microscopic observation, the powder had a primary particle diameter of from 20 to 50 nm. This powder was press-molded under a pressure of 100 kg/cm$^2$, and the press-molded product showed an electro-conductivity with a specific resistance of from 10 to 20 Ωcm.

COMPARATIVE EXAMPLE 1

The dried product of a wet cake obtained in Example 2 was put into an aluminum crucible and calcined in an electric furnace at 950° C. for 4 hours. The obtained powder was gray and as a result of the X-ray diffraction, was found to correspond to the peaks of indium antimonate of ASTM. The peaks were sharper than the X-ray diffraction peaks of the powder obtained in Example 2, thus indicating that the crystallization was more advanced. Further, this powder was press-molded under a pressure of 100 kg/cm$^2$, and the press-molded product showed only a low electro-conductivity with a specific resistance of from 100 to 200 kΩcm.

COMPARATIVE EXAMPLE 2

600 g of water was added to 600 g of the diantimony pentoxide sol (specific gravity: 1.198, $Sb_2O_5$ concentration: 18.4 wt %) prepared in Preparation Example 1 for dilution. Then, an aqueous indium nitrate solution having 121.1 g of indium nitrate ($In(NO_3)_3 \cdot 3H_2O$, $In_2O_3$ content: 39.1 wt %, guaranteed reagent, manufactured by Mitsuwa Kagaku Yakuhin K.K.) dissolved in 100 g of water, was added thereto with stirring at room temperature. Then, the mixture was heated at 90° C. for 9 hours to obtain a mixed slurry of indium hydroxide and diantimony pentoxide. This slurry had an $In_2O_3$ concentration of 3.3 wt %, a $Sb_2O_5$ concentration of 7.8 wt % and an $In_2O_3/Sb_2O_5$ molar ratio of 0.5.

This slurry was evaporated to dryness at 150° C. by a hot air drier to obtain 168.3 g of a dried product. This dried product was pulverized by a mortar to obtain a powder. Then, the powder was put into an aluminum crucible and calcined in an electric furnace at 780° C. for 19 hours to obtain 149.9 g of a powder. This powder was slightly bluish gray and as a result of the X-ray diffraction, was found to have diffraction peaks of indium antimonate ($InSbO_4$) and diffraction peaks of diantimony tetroxide of ASTM. This powder was pulverized by a Jet-O-Mizer to obtain a fine powder having an average particle size of 1.2 μm as measured by a centrifugal sedimentation particle size distribution measurement. Further, this powder had a specific surface area of 14.2 m$^2$/g as measured by a BET method and a particle diameter of 61.5 nm as calculated from the specific surface area. Further, from the transmission electron microscopic observation, the powder was found to be a colloidal particle of substantially spherical shape with a primary particle diameter of from 20 to 50 nm. However, when this powder was press-molded under a pressure of 100 kg/cm$^2$, the press-molded product showed only such a low electro-conductivity as a specific resistance of from 500 to 1000 kΩcm.

COMPARATIVE EXAMPLE 3

10 g of commercially available indium hydroxide ($In_2O_3 \cdot xH_2O$, $In_2O_3$ content: 80 wt %, manufactured by Mitsuwa Kagaku Yakuhin K.K.) was pulverized in a mortar to obtain a powder. Then, this powder was put into an aluminum crucible and calcined in an electric furnace at 800° C. for 19 hours to obtain a powder. This powder was yellowish white, and its electro-conductivity was measured, whereby no substantial electro-conductivity was shown.

The electro-conductive oxide particle of the present invention comprises indium atoms, antimony atoms and oxygen atoms in a molar ratio of In:Sb:O being 1:0.02–1.25:1.55–4.63, and they are substantially a single substance of antimony-doped indium oxide or indium antimonate, or a mixture of antimony-doped indium oxide and indium antimonate.

The electro-conductive oxide particle is the fine particle with a primary particle diameter of from 5 to 500 nm, and it is possible to obtain a highly transparent sol by dispersing them. Further, this oxide has electro-conductivity and has a specific resistance of from 1 Ωcm to 1000 Ωcm. Further, this oxide is stable in an aqueous solution or in an organic solvent, and it is also stable at a high temperature. Further, it has a high refractive index. This oxide contains diantimony pentoxide and thus has a function as a flame retarding additive.

Accordingly, the electro-conductive oxide particle of the present invention can be used as an antistatic agent by incorporating or coating them to plastic molded products, plastic films, plastic fibers, glass or paper. They are particularly useful as a transparent antistatic agent. Further, they may be used as a resistor by coating and calcining them on the surface of glass or ceramics.

The electro-conductive oxide particle of the present invention can be used as a transparent antistatic agent, a high refractive index hard coat agent, an antireflection agent, a coating agent having antistatic ability or an electro-rheological fluid, by using them as mixed with a partially hydrolyzed solution of a silane coupling agent, a hydrolyzed solution of ethyl silicate or methyl silicate, a resin emulsion, a water-soluble polymer solution, an organic solvent solution of a resin such as methyl methacrylate, silicone oil or a coating material.

Further, the electro-conductive oxide particle of the present invention can be used also as a surface-treating agent for metal by mixing them with e.g. water glass, an aqueous aluminum phosphate solution, an aqueous chromic acid solution or a plating solution.

The electro-conductive oxide particle of the present invention can be used in combination with an organic halogenated compound for a resin such as polyethylene, polypropylene, polystyrene, an acryl resin, polycarbonate, polyester, an epoxy resin or polyurethane, or may be incorporated to e.g. a halogen-containing vinyl resin or a modacryl resin, to render such a resin flame retardant.

Further, this oxide can be used also as a microfiller for a composite material of e.g. metal, plastic or ceramics.

We claim:

1. A process for producing an electro-conductive oxide particle comprising indium atoms, antimony atoms and oxygen atoms in a molar ratio of In:Sb:O being 1:0.02–1.25:1.55–4.63 and having a primary particle diameter of from 5 to 500 nm, which comprises mixing an indium compound with an antimony oxide particle having a primary particle diameter of from 2 to 300 nm in a molar ratio of In/Sb being from 0.8 to 50, and calcining the mixture in an atmosphere at a temperature of from 720° to 850° C.

2. A process for producing an electro-conductive oxide particle comprising indium atoms, antimony atoms and oxygen atoms in a molar ratio of In:Sb:O being 1:0.83–1.25:3.58–4.63, having a primary particle diameter of from 5 to 500 nm and having a crystal structure of indium antimonate, which comprises mixing an indium compound with an antimony oxide particle having a primary particle diameter of from 2 to 300 nm in a molar ratio of In/Sb being from 0.8 to 1.2, and calcining the mixture in an atmosphere at a temperature of from 720° to 850° C.

3. A process for producing a mixture comprising (1) electro-conductive oxide particle having a crystal structure of indium antimonate, (2) an electro-conductive oxide particle having a crystal structure of indium oxide, and (3) an electro-conductive oxide particle having a crystal structure of indium antimonate and a crystal structure of indium oxide, wherein the respective particles have a primary particle diameter of from 5 to 500 nm, and said mixture comprises indium atoms, antimony atoms and oxygen atoms in a molar ratio of In:Sb:O being 1:0.10–0.83:1.75–3.58, which comprises mixing an indium compound with antimony oxide particles having a primary particle diameter of from 2 to 300 nm in a molar ratio of In/Sb being from 1.2 to 10, and calcining the mixture in an atmosphere at a temperature of from 720° to 850° C.

4. A process for producing an electro-conductive oxide particle comprising indium atoms, antimony atoms and oxygen atoms in a molar ratio of In:Sb:O being 1:0.02–0.10:1.55–1.75, having a primary particle diameter of from 5 to 500 nm and having a crystal structure of indium oxide, which comprises mixing an indium compound with an antimony oxide particle having a primary particle diameter of from 2 to 300 nm in a molar ratio of In/Sb being from 10 to 50, and calcining the mixture in an atmosphere at a temperature of from 720° to 850° C.

5. The process for producing the electro-conductive oxide particle according to claim 1, wherein the indium compound is at least one indium compound selected from the group consisting of indium hydroxide, indium oxide, an indium salt of inorganic acid, and an indium salt of organic acid and an organic indium compound.

6. The process for producing the electro-conductive oxide particle according to claim 2, wherein the indium compound is at least one indium compound selected from the group consisting of indium hydroxide, indium oxide, an indium salt of inorganic acid, and an indium salt of organic acid and an organic indium compound.

7. The process for producing the electro-conductive oxide particle according to claim 3, wherein the indium compound is at least one indium compound selected from the group consisting of indium hydroxide, indium oxide, an indium salt of inorganic acid, and an indium salt of organic acid and an organic indium compound.

8. The process for producing the electro-conductive oxide particle according to claim 4, wherein the indium compound is at least one indium compound selected from the group consisting of indium hydroxide, indium oxide, an indium salt of inorganic acid, and an indium salt of organic acid and an organic indium compound.

9. The process for producing the electro-conductive oxide particle according to claim 1, wherein the antimony oxide particle having a primary particle diameter of from 2 to 300 nm, is a diantimony pentoxide particle.

10. The process for producing the electro-conductive oxide particle according to claim 2, wherein the antimony oxide particle having a primary particle diameter of from 2 to 300 nm, is a diantimony pentoxide particle.

11. The process for producing the electro-conductive oxide particle according to claim 3, wherein the antimony oxide particle having a primary particle diameter of from 2 to 300 nm, is a diantimony pentoxide particle.

12. The process for producing the electro-conductive oxide particle according to claim 4, wherein the antimony oxide particle having a primary particle diameter of from 2 to 300 nm, is a diantimony pentoxide particle.

13. The process for producing the electro-conductive oxide particle according to claim 5, wherein the antimony oxide particle having a primary particle diameter of from 2 to 300 nm, is a diantimony pentoxide particle.

14. The process for producing the electro-conductive oxide particle according to claim 6, wherein the antimony oxide particle having a primary particle diameter of from 2 to 300 nm, is a diantimony pentoxide particle.

15. The process for producing the electro-conductive oxide particle according to claim 7, wherein the antimony oxide particle having a primary particle diameter of from 2 to 300 nm, is a diantimony pentoxide particle.

16. The process for producing the electro-conductive oxide particle according to claim 8, wherein the antimony oxide particle having a primary particle diameter of from 2 to 300 nm, is a diantimony pentoxide particle.

17. The process according to claim 1, wherein the antimony oxide particle is selected from the group consisting of diantimony pentoxide sol, a hexantimony tridecoxide sol, a hydrous diantimony tetroxide sol and a colloidal diantimony trioxide powder.

18. The process according to claim 2, wherein the antimony oxide particle is selected from the group consisting of diantimony pentoxide sol, a hexantimony tridecoxide sol, a hydrous diantimony tetroxide sol and a colloidal diantimony trioxide powder.

19. The process according to claim 5, wherein the antimony oxide particle is selected from the group consisting of diantimony pentoxide sol, a hexantimony tridecoxide sol, a hydrous diantimony tetroxide sol and a colloidal diantimony trioxide powder.

20. The process according to claim 6, wherein the antimony oxide particle is selected from the group consisting of diantimony pentoxide sol, a hexantimony tridecoxide sol, a hydrous diantimony tetroxide sol and a colloidal diantimony trioxide powder.

* * * * *